United States Patent
Speigle et al.

(10) Patent No.: US 11,367,292 B2
(45) Date of Patent: Jun. 21, 2022

(54) ROAD MARKING DETECTION

(71) Applicant: Ford Global Technologies, LLC, Dearborn, MI (US)

(72) Inventors: Jon Speigle, Livonia, MI (US); David Michael Herman, Oak Park, MI (US); Kyle B. Sorensen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 16/798,956

(22) Filed: Feb. 24, 2020

(65) Prior Publication Data
US 2021/0264169 A1 Aug. 26, 2021

(51) Int. Cl.
*G06V 20/56* (2022.01)
*G06V 10/141* (2022.01)
(Continued)

(52) U.S. Cl.
CPC ......... *G06V 20/588* (2022.01); *G05D 1/0253* (2013.01); *G06T 3/4015* (2013.01);
(Continued)

(58) Field of Classification Search
None
See application file for complete search history.

(56) References Cited

U.S. PATENT DOCUMENTS

| 8,831,286 B2 | 9/2014 | Li et al. |
| 9,674,459 B2 | 6/2017 | Kasahara et al. |

(Continued)

FOREIGN PATENT DOCUMENTS

| CN | 107111949 A | * | 8/2017 | ........... B60K 28/066 |
| JP | H02145912 A | * | 6/1990 | |

(Continued)

OTHER PUBLICATIONS

Mistry, V. H., et al., "Survey: Vision based Road Detection Techniques," International Journal of Computer Science and Information Technologies, vol. 5 (3), 2014, pp. 4741-4747.

(Continued)

*Primary Examiner* — Mohammed Rachedine
(74) *Attorney, Agent, or Firm* — Frank A. MacKenzie; Bejin Bieneman PLC

(57) ABSTRACT

A processing system comprises a processor and a memory. The memory stores instructions executable by the processor to receive a polarimetric image from a polarimetric camera sensor, and to identify a road surface in the received image based on a vehicle location, an orientation of the camera sensor, and a vehicle pose. The memory stores instructions, upon identifying, in the polarimetric image, polarized light reflections from the identified road surface based on a polarization direction and a polarization degree determined from the polarimetric image, to remove the identified polarized light reflections from the polarimetric image, thereby generating an updated polarimetric image including generating a de-mosaicked imaged based on the identified polarized light reflections, wherein the identified polarized light reflections are ignored at de-mosaicking, and to identify a road feature including a lane marking based on the updated polarimetric image.

20 Claims, 4 Drawing Sheets

(51) Int. Cl.
| | |
|---|---|
| *G06V 10/30* | (2022.01) |
| *G06V 10/145* | (2022.01) |
| *G06V 20/58* | (2022.01) |
| *G05D 1/02* | (2020.01) |
| *G06T 3/40* | (2006.01) |
| *B60W 30/12* | (2020.01) |
| *B60W 30/18* | (2012.01) |
| *H04N 5/235* | (2006.01) |
| *G06V 10/50* | (2022.01) |

(52) U.S. Cl.
CPC ............ *G06V 10/141* (2022.01); *G06V 10/30* (2022.01); *G06V 10/507* (2022.01); *B60W 30/12* (2013.01); *B60W 30/18009* (2013.01); *G05D 2201/0213* (2013.01); *H04N 5/2353* (2013.01)

(56) References Cited

U.S. PATENT DOCUMENTS

| 10,395,113 B2 * | 8/2019 | Aycock ................ G01V 8/10 |
| 2012/0242835 A1 | 9/2012 | Li et al. |
| 2016/0269694 A1 * | 9/2016 | Masuda ............ H04N 9/0451 |
| 2019/0017807 A1 * | 1/2019 | Kondo ............. G01B 11/0683 |

FOREIGN PATENT DOCUMENTS

| JP | 2010064531 A | * | 3/2010 |
| JP | 2010064531 A | | 3/2010 |
| WO | 2010136344 A1 | | 12/2010 |

OTHER PUBLICATIONS

Hillel, A. B., et al., "Recent Progress in Road and Lane Detection—A survey," Advanced Technical Center—Israel General Motors—R&D, 2012, 20 pages.

Kumar, A. M., et al., "Review of Lane Detection and Tracking Algorithms in Advanced Driver Assistance System," International Journal of Computer Science & Information Technology (IJCSIT) vol. 7, No. 4, Aug. 2015, 14 pages.

* cited by examiner

ROAD MARKING DETECTION

BACKGROUND

Vehicles can be equipped with various sensors to detect objects in an area surrounding the vehicle. Vehicle computers can control various vehicle operations based on data received from the sensors. Various types of sensors can be affected by environmental conditions around the vehicle. Weather conditions such as rain may affect sensor data. A vehicle sensor such as a camera sensor may not detect markings and/or other objects, for example, on a wet road.

DETAILED DESCRIPTION

Introduction

Figure 1:
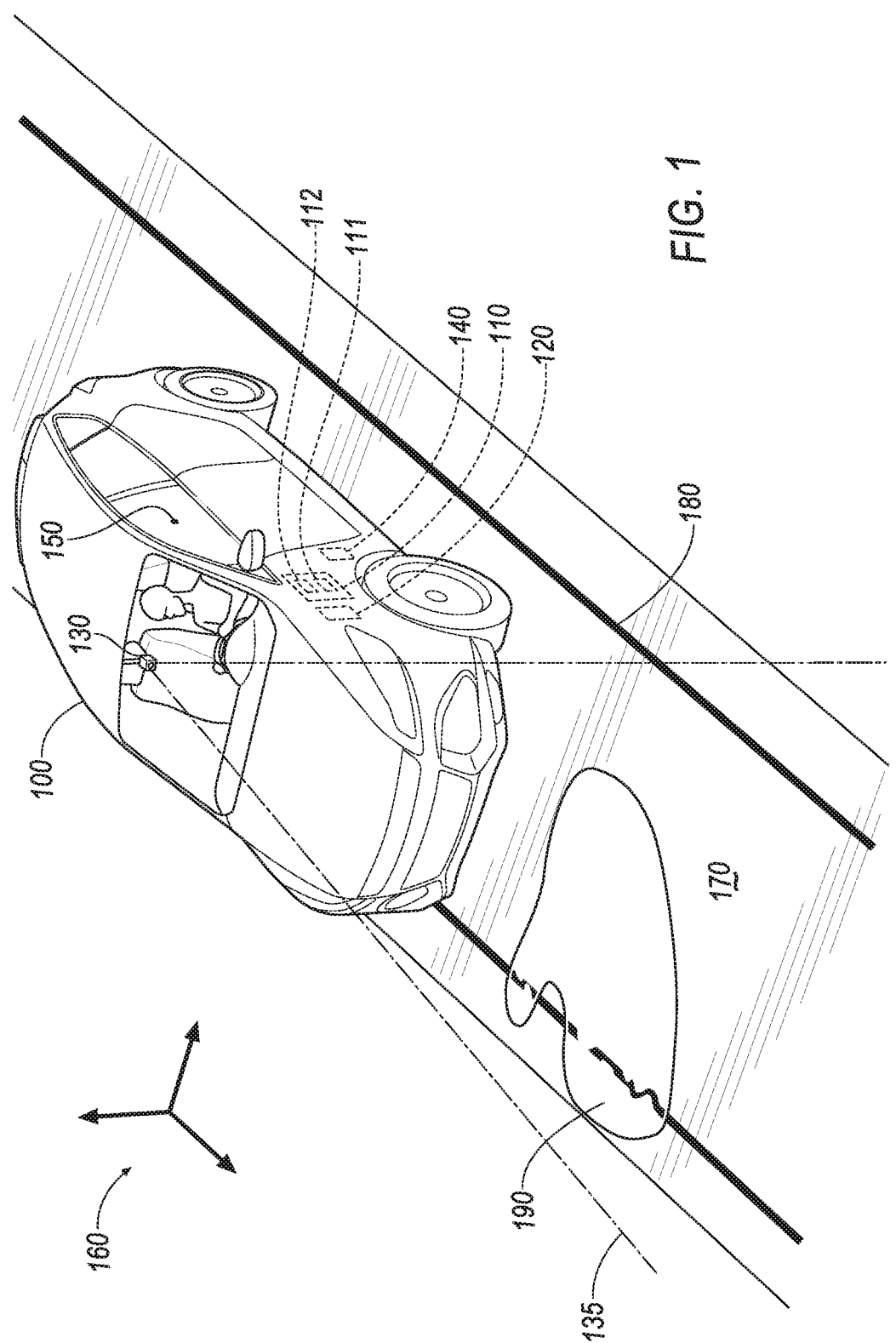
FIG. 1 shows a vehicle with one or more polarimetric camera sensors.

Disclosed herein is processing system comprising a processor and a memory. The memory stores instructions executable by the processor to receive a polarimetric image from a polarimetric camera sensor, to identify a road surface in the received image based on a vehicle location, an orientation of the camera sensor, and a vehicle pose, upon identifying, in the polarimetric image, polarized light reflections from the identified road surface based on a polarization direction and a polarization degree determined from the polarimetric image, to remove the identified polarized light reflections from the polarimetric image, thereby generating an updated polarimetric image including generating a de-mosaicked imaged based on the identified polarized light reflections, wherein the identified polarized light reflections are ignored at de-mosaicking, and to identify a road feature including a lane marking based on the updated polarimetric image.

The instructions to identify the road surface may include instructions to identify a plurality of pixels in the received image that represent the road surface based on the vehicle location, the vehicle pose, and the orientation of the camera.

The instructions may further include instructions to determine intensity of a plurality of pixels in the received image, to calculate a histograms of the received image based on the determined intensities, to determine whether the received image is oversaturated or undersaturated based on the calculated histogram of the received image, and upon determining that one of an oversaturation and undersaturation exists in the received polarimetric image, to modify a camera parameter and receive a second polarimetric image based on the modified camera parameter.

The instructions to modify the camera parameter may include instructions to increase a camera exposure time upon determining that the received image is undersaturated.

The instructions to modify the camera parameter may include instructions to decrease a camera exposure time upon determining that the received image is oversaturated.

The instructions may further include instructions to identify the road surface in the received image further based on map data.

The road features may include at least one of a solid single line, solid double line, single broken line, and pedestrian marking.

The instructions may further include instructions to, upon determining that a noise ratio of the updated image exceeds a threshold, (i) ignore the received polarimetric image, (ii) receive a second polarimetric image, and (iii) identify the road feature based on an updated second polarimetric image.

The instructions may further include instructions to determine refracted light from the road surface by removing the received polarized light reflections from the polarimetric image and identifying the road feature based on refracted light represented in the updated polarimetric image.

The instructions may further include instructions to determine a Stokes parameter of the polarimetric image based on received intensity levels of light at a plurality of polarization degrees, to determine a degree of linear polarization of the image based on the determined Stokes parameters, and to determine the reflected light based on the determined degree of linear polarization.

The instructions to determine the reflected light may include instructions to determine s-wave components and p-wave components of the polarimetric image.

The instructions may further include instructions to actuate the vehicle based on detected road feature.

The instructions may further include instructions to detect a wet area on the road surface based on identified polarized light reflections and to update image pixels corresponding to the detected wet area.

Further disclosed herein is a method, comprising receiving a polarimetric image from a polarimetric camera sensor, identifying a road surface in the received image based on a vehicle location, an orientation of the camera sensor, and a vehicle pose, upon identifying, in the polarimetric image, polarized light reflections from the identified road surface based on a polarization direction and a polarization degree determined from the polarimetric image, removing the identified polarized light reflections from the polarimetric image, thereby generating an updated polarimetric image including generating a de-mosaicked imaged based on the identified polarized light reflections, wherein the identified polarized light reflections are ignored at de-mosaicking, and identifying a road feature including a lane marking based on the updated polarimetric image.

The method may further include identifying the road surface by identifying a plurality of pixels in the received image that represent the road surface based on the vehicle location, the vehicle pose, and the orientation of the camera.

The method may further include identifying the road surface in the received image further based on map data.

The road features may include at least one of a solid single line, solid double line, single broken line, and pedestrian marking.

The method may further include determining refracted light from the road surface by removing the received polarized light reflections from the polarimetric image and identifying the road feature based on refracted light represented in the updated polarimetric image.

The method may further include determining a Stokes parameter of the polarimetric image based on received intensity levels of light at a plurality of polarization degrees, determining a degree of linear polarization of the image based on the determined Stokes parameters, and determining the reflected light based on the determined degree of linear polarization.

The method may further include detecting a wet area on the road surface based on identified polarized light reflections and to update image pixels corresponding to the detected wet area.

Further disclosed is a computing device programmed to execute any of the above method steps. Yet further disclosed is a vehicle comprising the computing device.

Yet further disclosed is a computer program product comprising a computer-readable medium storing instructions executable by a computer processor, to execute any of the above method steps.

System Elements

Disclosed herein are improvements to sensors such as image sensors, including improves techniques for detecting road features such as lane markings on a wet or icy road surface. A water layer on road surface may change the return signal from the road surface and reduce accuracy of road features detection. By removing (or ignoring) reflection caused by water on the road surface, road marking detection can be improved. A vehicle computer, programmed to detect road features such as lane markings based on image data, may have an impaired or lack of ability to detect road features on a wet or icy road surface. Advantageously, a vehicle processing system can be configured to receive a polarimetric image from a polarimetric camera sensor, e.g., a forward-looking vehicle camera sensor, and to identify a road surface in the received image based on a vehicle location, an orientation of the camera sensor, and a vehicle pose. The system can then identify, in the polarimetric image, polarized light reflections from the identified road surface (or water on the road surface) based on a polarization direction and a polarization degree determined from the polarimetric image. The processing system can further, upon identifying the polarized light reflections, remove the identified polarized light reflections from the polarimetric image, thereby generating an updated polarimetric image. The processing system can identify a road feature including a lane marking based on the updated polarimetric image. The vehicle processing system may be programmed to actuate a vehicle actuator, e.g., a steering actuator, to keep the vehicle in a lane, which otherwise may be partially impaired due to lack of lane detection on a wet or icy road. In one example, the processing system may be programmed to identify the road surface in the received image based on the vehicle location, the orientation of the camera sensor, a vehicle pose, and possibly also received map data.

FIG. 1 illustrates a vehicle 100. The vehicle 100 may be powered in a variety of ways, e.g., with an electric motor and/or internal combustion engine. The vehicle 100 may be a land vehicle such as a car, truck, etc. A vehicle 100 may include a processing system 110, actuator(s) 120, sensor(s) 130, and a human-machine interface (HMI 140). The vehicle 100 can have a reference point 150, e.g., a geometric center (i.e., a point where a longitudinal axis and a lateral axis of a vehicle 100 body intersect), or some other specified point.

FIG. 1 further illustrates a road surface 170. A road surface 170 may be a tared surface and/or a dirt road surface. Vehicles 100, bicycles, etc., may traverse on a road surface 170. Various types of road features such as a lane marking 180 may be painted on and/or otherwise affixed or attached to a road surface 170. A lane marking 180 (or road marking 180) may include, for example, a solid single line, solid double line, single broken line, pedestrian marking, and/or turn arrows such as right or left turn arrows painted on a road surface 170.

The processing system 110 is a set of one or more electronic components in the vehicle 100 that take first data as input and provide second data as output based on processing the first data. The processing system 110 includes, i.e., one of the electronic components is, a vehicle computer 111 and may also include other electronic components such as electronic control modules (ECUs) or the like, as well as one or more dedicated electronic circuits 112, i.e., hardware such as a Field-Programmable Gate Array (FPGA), Application-Specific Integrated Circuit (ASIC), System-On-Chip (SOC), etc. The computer 111 includes a processor and a memory such as are known. The memory includes one or more forms of computer-readable media, and stores instructions executable by the computer 111 for performing various operations, including as disclosed herein. A dedicated electronic circuit 112 is an integrated circuit developed for a particular use, as opposed to a general-purpose device. In one example, a dedicated electronic circuit 112 includes an ASIC that is manufactured for a particular operation, e.g., an ASIC for calculating histogram of received images of a sensor 130. In another example, a dedicated electronic circuit 112 includes an FPGA which is an integrated circuit manufactured to be configurable by a customer. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging.

In the context of this document, a statement that the processing system 110 is programmed to execute an instruction or function can mean that a general purpose computer 110 or ECU (i.e., including a general purpose CPU) is programmed to execute program instructions. Additionally or alternatively, the processing system 110 being programmed to execute an instruction or function can mean that an electronic circuit 112 performs an operation specified based on a hardware description language programming such as VHDL, as discussed above. Further, the processing system 110 can be programmed to execute a series or set or steps where a first step or steps are executed by a first computer or electronic circuit 111, 112 and a second step or steps are executed by a second computer or electronic circuit 111, 112.

In one example, a dedicated hardware of the processing system 110 may process received image data from an image sensor and calculate a polarization angle and/or a polarization degree of each image pixel, whereas a processor of the processing system 110 may be programmed to received data from the dedicated hardware and navigate the vehicle 100 by actuating vehicle 100 actuators 120.

The processing system 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the processing system 110; in a semi-autonomous mode the processing system 110 controls one or two of vehicles 100 propulsion, braking, and steering; in a non-autonomous mode, an operator occupant, i.e., one of the one or more occupant(s), controls the vehicle 100 propulsion, braking, and steering. In a non-autonomous mode, the processing system 110 may be programmed to detect lane markings 180. The processing system 110 may be programmed using conventional techniques to output a lane departure warning upon determining that the vehicle 100 is departing from a current lane.

In some examples, in an autonomous mode, a vehicle 100 occupant may receive information from a vehicle 100 HMI 140 instructing the occupant to regain a control of the vehicle 100 propulsion, braking, and/or steering upon detecting specified conditions, e.g., upon detecting a failure in one or more vehicle 100 sensors 130 to detect a road feature such as a lane marking 180.

The processing system 110 may include programming to operate one or more of vehicle 100 brakes, propulsion (e.g., control of vehicle 100 speed and/or acceleration by controlling one or more of an internal combustion engine, electric motor, hybrid engine, etc.), steering, climate control, interior and/or exterior lights, etc., as well as to determine whether and when the processing system 110, as opposed to a human operator, is to control such operations. Additionally, the processing system 110 may be programmed to determine whether and when a human operator is to control such operations. For example, the processing system 110 may determine that in the non-autonomous mode, a human operator is to control the propulsion, steering, and braking operations.

The processing system 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The processing system 110 is generally arranged for communications on a vehicle communication network that can include a bus in the vehicle such as a controller area network (CAN) or the like, and/or other wired and/or wireless mechanisms.

Via the vehicle 100 network, the processing system 110 may transmit messages to various devices in the vehicle and/or receive messages from the various devices, e.g., an actuator 120, an HMI 140, etc. Alternatively or additionally, in cases where the processing system 110 comprises multiple devices, the vehicle 100 communication network may be used for communications between devices represented as the processing system 110 in this disclosure. As discussed further below, various electronic controllers and/or sensors 130 may provide data to the processing system 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. FIG. 1 shows an example camera sensor 130. For example, the sensors 130 may include one or more camera sensors 130, radar, infrared, and/or LIDAR sensors 130 disposed in the vehicle 100 and/or on the vehicle 100 providing data encompassing at least some of the vehicle 100 interior and exterior. The data may be received by the processing system 110 through a suitable interface. A camera sensor 130 disposed in and/or on the vehicle 100 may provide object data including relative locations, sizes, and shapes of objects such as other vehicles surrounding the vehicle 100 and/or location of road 170 features, e.g., lane marking(s) 180. A vehicle 100 processing system 110 may receive the object data and/or lane marking 180 location data and operate the vehicle 100 in an autonomous and/or semi-autonomous mode based at least in part on the received sensor 130 data.

The object data and/or location of road surface 170 features such as lane markings 180 may be specified with respect to a coordinate system 160. The coordinate system 160 may be a Cartesian coordinate system with an origin point, e.g., specified according to latitude, longitude pairs in the GPS (Global Positioning System) coordinate system. A location or locations, i.e., location coordinates, of a road feature such as a lane marking 180 can be specified by (i) a mathematical function and/or (ii) a set of discrete points specified by a set of coordinates. For example, a mathematical function describing a set of locations defined by a lane marking 180 could be $Y=a+bX+cX^2$, where X, Y represent longitudinal and lateral location coordinates with respect to a coordinate system 160. Thus, the foregoing function could describe a curvature, for example of a lane marking 180 on the road surface 170. In another example, location coordinates of a plurality of points on the lane marking 180 could be provided; the lane marking 180 could be more fully described or approximated by interpolating between provided points.

In the present context, an orientation of a camera sensor 130 is an imaginary line passing through the camera sensor 130 in the field of view 135 of the camera sensor 130, e.g., an axis of a camera sensor 130 lens. The orientation can be provided with respect to the 3D coordinate system 160 such as just described.

A vehicle 100 pose is a combination of roll, pitch, and yaw of the vehicle 100 specified with respect to a coordinate system, e.g., the coordinate system 160. A pose of a vehicle 100 may change based on acceleration, deceleration, steering, braking, and/or loading condition of the vehicle 100. When a camera sensor 130 is attached to a vehicle 100, e.g., to a front windshield looking toward roadway, then an orientation of the vehicle 100 camera sensor 130 may change when the vehicle 100 pose changes.

The vehicle 100 processing system 110 may receive vehicle 100 location data from a vehicle 100 location sensor 130, e.g., a GPS sensor 130. Vehicle 100 location coordinates include longitudinal, lateral, and elevation of a vehicle 100 reference point 150 relative to a coordinate system 160, e.g., GPS coordinate system.

In the present context, map data specifies location coordinates of road surface 170, buildings, and/or other stationary physical objects such as traffic signs, bridges, etc. A high Definition (HD) map may specify three-dimensional (3D) location coordinates of points on surfaces such as exterior surfaces of buildings, bridges, guard rails, etc., and/or points on a road surfaces 170, vegetation, etc.

The 3D location coordinates may be specified in a 3D Cartesian coordinate system 160 with an origin point such as described above. For example, location coordinates of a point on the road surface 170 may be specified by X, Y, and Z coordinates. X and Y coordinates, i.e., horizontal coordinates, may be global positioning system (GPS) coordinates (i.e., lateral and longitudinal coordinates) or the like, whereas a Z coordinate may specify a vertical component to a location, i.e., a height (or elevation) of a point from an x-axis representing a specified vertical location, e.g., a sea level, a ground level, etc. A 3D map may be generated based on data received from a lidar sensor 130 which sweeps an area with light beams and receives reflections of the broadcasted light beams from outer surfaces of the objects. In the present context, an area is a 3D volume above ground with a bottom touching the ground surface and a top above the ground surface, e.g., at 50 meters from the ground surface. Thus, such a 3D map may include location coordinates of the points on outer surfaces of objects.

A vehicle 100 processing system 110 may be programmed to localize the vehicle 100 based on object data received from a vehicle 100 object detection sensor 130 such as a LIDAR sensor 130 that provides 3D location coordinates of points on surfaces around the vehicle 100 and the received HD map data. Localization, in the present context, includes determining vehicle 100 location coordinates and the vehicle 100 pose.

The vehicle 100 may include an HMI 140 configured to display information received from a vehicle 100 processing system 110 and/or send information, e.g., entered by a vehicle 100 occupant, to a vehicle 100 processing system 110. Thus, an HMI 140 may be located in the interior of the vehicle 100. In an example, the processing system 110 may output information indicating a selected mode of operation of the vehicle 100, e.g., the autonomous mode.

Polarization of light (or a light beam) may be specified with a degree of polarization and a direction of polarization. Additionally or alternatively, a polarization of light may be specified by Stokes parameters which include an intensity I, a degree of polarization, and shape parameters of a polarization ellipse. A distribution of light waves that are uniformly vibrating in more than one direction is referred to as unpolarized light. Polarized light waves are light waves in which the vibrations occur wholly or partially in a single plane. The process of transforming unpolarized light into polarized light is known as polarization. The direction of polarization is defined to be a direction parallel to an electromagnetic field of the light wave. A direction of polarization (i.e., a direction of vibration) may be specified with an angle between 0 and 360 degrees. Unpolarized light includes many light waves (or rays) having random polarization directions, e.g., sunlight, moonlight, fluorescent light, vehicle headlights, etc. Light reflected from a wet surface, e.g., a wet road surface 170, may include polarized light waves, as discussed below.

Light can be polarized by passage through a polarizing filter or other polarizing material. A degree of polarization is a quantity used to describe the portion of an electromagnetic wave that is polarized. A perfectly polarized wave has a degree of polarization (or polarization degree) of 100% (i.e., restricting light waves to one direction), whereas an unpolarized wave has a polarization degree of 0% (i.e., no restriction with respect to a direction of vibration of a light wave). For example, laser light emission is known to be fully polarized. A partially polarized wave can be represented by a combination of polarized and unpolarized components, thus having a polarization degree between 0 and 100%. A polarization degree is calculated as a fraction of a total power that is carried by the polarized component of the light wave.

Figure 2:
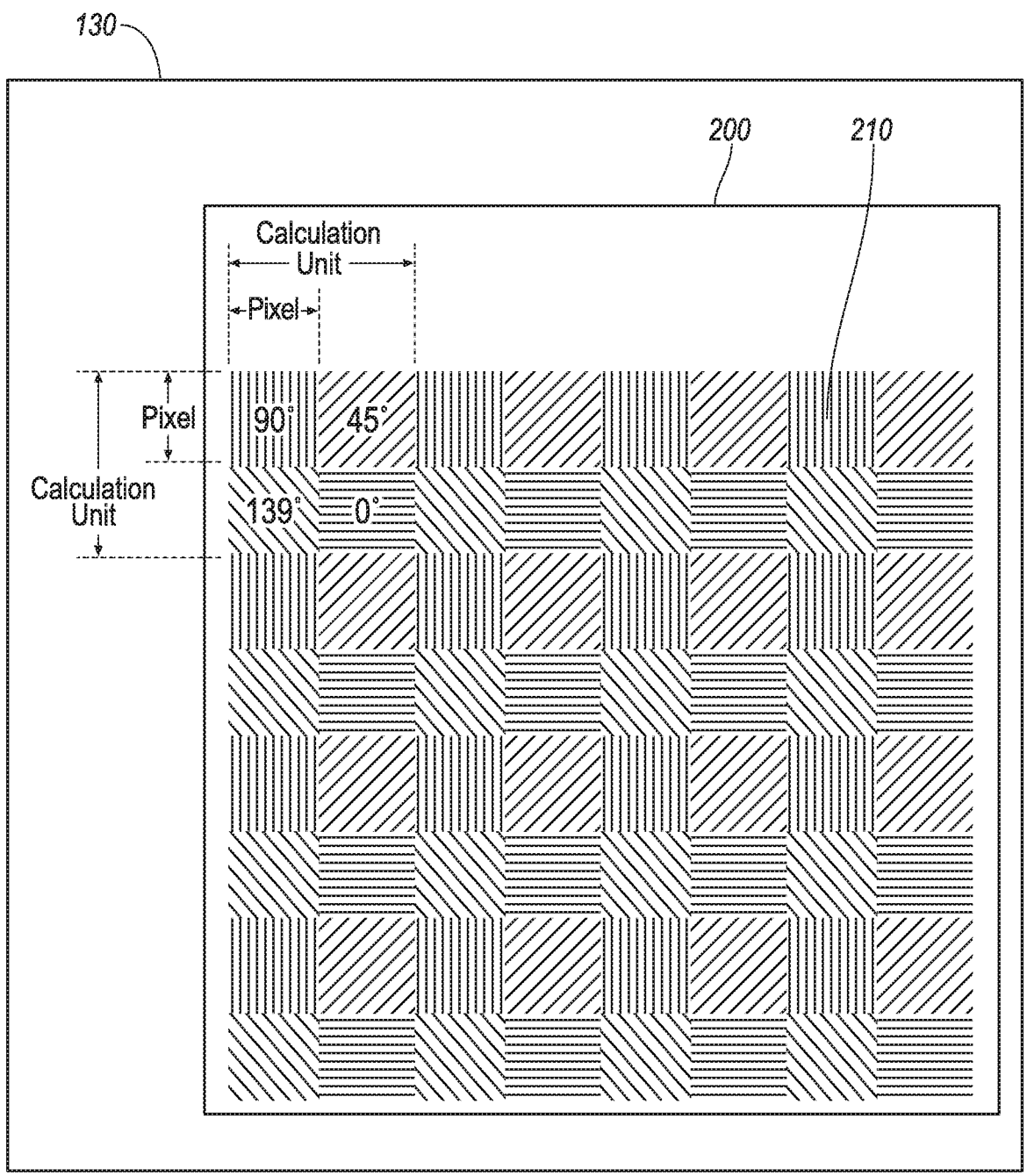
FIG. 2 is a diagram showing the example camera sensor of FIG. 1 including a polarizing image sensing device for detection of received light polarization.

A polarimetric image, in the present context, is an image received from a polarimetric camera sensor 130. A polarimetric camera sensor 130 is a digital camera including optical and/or electronic components, e.g., an image sensing device 200, as shown in FIG. 2, configured to filter polarized light and detect the polarization of the received light. Other filtering methods may also be possible to create a polarized image data. A polarimetric camera sensor 130 may determine a polarization degree of received light in various polarization directions. Light has physical properties such as brightness (or amplitude), color (or wavelength), polarization direction, and a polarization degree. For example, unpolarized light may have a population of light waves uniformly distributed in various directions (i.e., having different directions) resulting in a "low" polarization degree (i.e., below a specified threshold) and fully polarized light may include light waves having one direction resulting in a "high" polarization degree (i.e., above a specified threshold). In the present context, a "low" polarization degree may be 0% to 10%, and a "high" polarization degree may be defined as 90% to 100%. Each of these physical properties may be determined by a polarimetric camera sensor 130. A polarimetric camera sensor 130, e.g., using Polarized Filter Array (PFA), is an imaging device capable of analyzing the polarization state of light in a snapshot way. The polarimetric camera sensors 130 exhibit spatial variations, i.e. nonuniformity, in their response due to optical imperfections introduced during the nanofabrication process. Calibration is done by computational imaging algorithms to correct the data for radiometric and polarimetric errors.

FIG. 2 shows an example polarizing camera sensor 130. A polarizing camera sensor 130 typically includes a lens (not shown) that focuses received light on an image sensing device 200. A polarizing image sensing device 200 such as a CCD or CMOS sensor. Polarizing image sensing device 200 is an optoelectronic component that converts light to electrical signals. Image data output from an image sensing device 200 typically includes a plurality of pixel, e.g. 1 megapixel. The image sensing device 200 may include a plurality of individual optoelectronic components 210, each generating an electrical signal for each image pixel. Image data generated by the image sensing device 200 for each image pixel may be based on image attributes including a polarization direction (or axis), polarization degree, an intensity, and/or a color space.

To filter detected polarized light, a polarizing material, e.g., in form of a film, may be placed on the image sensing device 200 and/or may be included in the image sensing device 200. For example, to produce a polarizing film, tiny crystallites of iodoquinine sulfate, oriented in the same direction, may be embedded in a transparent polymeric film to prevent migration and reorientation of the crystals. As another example, Polarized Filter Array (PFA) may be used to produce a polarizing films. PFAs may include metal wire grid micro-structures, liquid crystals, waveplate array of silica glass, and/or intrinsically polarization-sensitive detectors. As shown in FIG. 2, the polarizing material on each optoelectronic component 210 may be configured such that light with a specific polarization direction, e.g., 0 (zero), 45, 90, 270 degrees, passes through the polarizing film. In one example, each optoelectronic component 210 generates image data corresponding to one or more image pixels. In one example, the optoelectronic components 210 of the image sensing device 200 may be arranged such that each set of 2×2 optoelectronic components 210 includes one of 0 (zero), 45, 90, and 270 degrees polarizing films. A polarimetric image is then produced using known de-mosaicking techniques, as discussed below. Additionally or alternatively, other techniques may be used such as a spinning filter, electro-optical filter, etc.

A received image typically includes noise. Noise levels may vary depending on ambient light conditions and/or camera parameters such as exposure time, gain, etc. An amount of noise in an image is typically specified as "noise ratio" or "signal-to-noise ratio" (SNR). Signal-to-noise ratio is a measure to specify a desired signal compared to a level of noise in the received data. SNR is specified as a ratio of signal power to a noise power, often expressed in decibels (dB). A ratio higher than 1:1 (greater than 0 dB) indicates more signal than noise. Camera sensor 130 parameters (or camera parameters) include parameters such as (i) exposure time, i.e., a length of time when the optoelectronic imaging component(s) 210 are exposed to light based on adjusted shutter time, (ii) camera gain which controls an amplification of image signal received from the image sensing device

200. A camera sensor 130 may include an Image Signal Processor (ISP) that receives image data from the imaging sensor 200 and performs de-mosaicking, noise reduction, adjusting of exposure time, auto focus, auto white balance, gain control (e.g., auto gain control), etc.

As discussed above, each of the optoelectronic components 210 of the image sensing device 200 may detect light that has a specific polarization direction. For example, an optoelectronic component 210 may detect light with a polarization direction of 90 degrees. The processing system 110 may be programmed to generate an image based on outputs of the optoelectronic components 210. This process is typically referred to as "de-mosaicking." In a de-mosaicking process, the processing system 110 may combine the image data received from each of the 2×2 adjacent optoelectronic sensors 210 and calculate the polarization degree, intensity I, and polarization direction of the received light for the set of 4 (four) optoelectronic components 210, e.g., assuming a degree of polarization of 45 degrees for the portion of image that is received from the optoelectronic component 210 having a 90 degree polarization film. In other words, considering the relatively small size of pixels, it can be assumed that light received at a pixel on a 90 degree polarization film has a same 45 degree polarization component as light received at an adjacent pixel, i.e., within a same set four optoelectronic components 210. The image produced from de-mosaicking may be referred to as the de-mosaicked image.

The processing system 110 may be programmed to determine an intensity, polarization direction, and degree of polarization, e.g., for each image pixel, based on data received from the camera sensor 130. The processing system 110 may be programmed to generate a polarization map based on the received image data. The processing system 110 may determine a set of intensity (e.g., specified in candela), a polarization direction (e.g., 0 to 360 degrees), and a polarization degree (e.g., 0 to 100%) for each pixel of the image.

For example, the processing system 110 may be programmed to generate a polarization map including a set of polarization data for each pixel of the image such as is shown in Table 1. Thus, the polarization map may specify whether polarized light with each of the four polarization directions detected and specify a polarization degree for each of the polarization directions.

Light intensity (or luminosity) I is a measure of the wavelength-weighted power emitted by a light source in a particular direction per unit solid angle, based on the luminosity function, a standardized model of the sensitivity of the human eye. A unit of measure of light intensity I is the candela (cd). A light intensity I may alternatively or additionally be specified in a range of 0 (zero) to 100% based on data received from a vehicle 100 camera sensor 130. An intensity I of light received by the camera sensor 130 may be individually specified based on an output of each of a plurality of polarization filters. For example, the processing system 110 may be programmed to determine for each image pixel at each of a plurality of polarization intensities) I(0°), I(45°), I(90°), I(135°). For example, an intensity I (45°) vis an intensity of light received after passing through a 45 degree polarization filter. In other words, an intensity I(45°) specifies an intensity of a portion of the light received at a respective pixel having a polarization of 45 degrees. A total intensity $I_{total}$ specifies an intensity of unpolarized light and polarized light in any polarization direction received at the camera sensor 130.

A light beam hitting a surface, e.g., a road surface 170, may be absorbed, diffused (or refracted) and/or reflected. Diffusion and reflection are well known concepts. Diffuse light reflection is reflection of light or other waves or particles from a surface 170 such that a light beam incident on the surface 170 is scattered at many angles rather than at just one angle as in a case of specular reflection. Many common materials, e.g., concrete, asphalt, etc., exhibit a mixture of specular and diffuse reflections. A light hitting a surface 170 that is wet, e.g., a wet area 195 of a road surface 170, and/or icy is substantially reflected (i.e., more reflected than diffused compared to a same surface in dry condition which would rather diffuse light instead of reflecting). A reflection from a wet area 195 is often described as a mirror-like reflection, in which the incident light is reflected into a single outgoing direction. Typically, reflected light from a water puddle 190 of a road surface 170 is polarized, whereas diffused light from a dry area of the road surface 170 is substantially unpolarized. As discussed below, this difference is used to enhance a detection of road features on the road surface 170 covered by the water puddle 190.

A total light intensity $I_{total}$ represented by a pixel of a polarimetric image, may include polarized and unpolarized light intensities, e.g., light intensity $I_{total}$ (m, n) at a pixel m,

TABLE 1

| Data | Description |
|---|---|
| Luminosity or intensity | Specified in candela (cd) or a percentage rate from 0 (zero) % (completely dark) to 100% (completely bright). |
| 0 (zero) degree polarization degree | A degree of polarization of light at the polarization direction of 0 (zero) degrees, e.g., a number between 0 (zero) and 100%. |
| 45 degree polarization | A degree of polarization of light at the polarization direction of 45 degrees, e.g., a number between 0 (zero) and 100%. |
| 90 degree polarization | A degree of polarization of light at the polarization direction of 90 degrees, e.g., a number between 0 (zero) and 100%. |
| 270 degree polarization | A degree of polarization of light at the polarization direction of 270 degrees, e.g., a number between 0 (zero) and 100%. |

The processing system 110 may be programmed to generate the polarization map based on image data received from the image sensing device 200 of the camera sensor 130. Additionally or alternatively, the camera sensor 130 may include electronic components which generate the polarization map and output the polarization map data to the processing system 110. Thus, the processing system 110 may receive polarization data, e.g., as illustrated by Table 1, for each pixel or set of pixels, from the polarimetric camera sensor 130.

n (i.e., coordinates m, n representing a location of the respective pixel in the image, e.g., in a pixel coordinate system having an origin at a bottom left corner of the image). Thus, a total intensity $I_{total}$ of a pixel can be specified as a sum of a received polarized light intensity $I_R$ and a received diffused (or unpolarized) light intensity $I_D$, as shown in Equation (1).

$$I_{total} = I_D + I_R \qquad (1)$$

A statistical distribution of intensity $I_{total}$ of image pixels may be specified by a histogram. A histogram, as is conventionally understood, is a statistical representation of intensity $I_{total}$ of pixels of an image. In other words, a histogram shows an amount of different particular intensities $I_{total}$ found in an image, e.g., in a range of 0 (zero) % to 100% intensities. For example, an ISP may be configured to calculate a histogram of an image. Additionally or alternatively, a processing system 110 may be programmed to calculate an image histogram.

An image having High Dynamic Range (HDR) means that an image has sufficient details (e.g., a statistical variance of intensities exceeding a threshold) from bright and dark areas, which is advantageous for image processing algorithms. For example, an image may be determined to have a High Dynamic Range when a difference between a minimum intensity $I_{min}$ and a maximum intensity $I_{max}$ of pixels in the image exceeds a threshold, e.g., 50%. The difference between minimum and maximum intensities $I_{min}$, $I_{max}$ of an image may be based on ambient lighting conditions and/or camera sensor 130 parameters such as exposure time, etc. In the context of imaging, color saturation, as commonly understood, is used to describe an intensity of an image. An "oversaturated" image has an average or mean intensity exceeding an oversaturation threshold, e.g., 80%. An "undersaturated" image has an average or mean intensity less than an undersaturation threshold, e.g., 30%. A mean or average intensity is determined based on intensity I of each of the image. The oversaturation and undersaturation thresholds may be determined based on empirical methods. In other words, the thresholds may be determined based on results of image processing in which the undersaturation and/or oversaturation results in a lack of detection of road features such as lane markings 180.

A processing system 110 may be programmed to determine a light intensity I of a plurality of pixels in a received image, to calculate a histogram of the received image based on the calculated intensities I, and to determine whether the received image is oversaturated or undersaturated based on the calculated histogram of the received image. The processing system 110 may be programmed, upon determining one of oversaturation and undersaturation in the received polarimetric image, to modify a camera parameter and to receive another polarimetric image after modifying the camera parameter. As discussed above, the camera parameter may be an exposure time, a camera gain, etc.

In one example, the processing system 110 may be programmed to modify a camera parameter by increasing the camera exposure time upon determining that the received image is undersaturated. The processing system 110 may be programmed to modify the camera parameter by decreasing the camera exposure time upon determining that the received image is oversaturated. In one example, the processing system 110 may be programmed to modify the camera parameters until a received image is neither oversaturated nor undersaturated. Additionally or alternatively, an ISP may be configured to perform such modification of camera parameters using auto exposure, auto gain control, etc.

Referring to Equations (2)-(3), a reflection index of a p-wave $R_P$ and a reflection index of an s-wave $R_s$ can be determined for the reflected light according to the Fresnel formula. A p-wave is a light wave having an electric field with a direction parallel to a plane of incidence (an imaginary plane perpendicular to a surface of the imaging sensor 200 wherein the light wave is within the imaginary plane). An s-wave is a light wave having an electric field oriented perpendicular to the plane of incidence. $\theta_1$ represents a reflection angle of light which is a same angle as an angle of incidence. $\theta_2$ is a refraction angle (not shown). A refraction angle $\theta_2$ may be determined based on the reflection angle $\theta_1$ and a refractive index n of the medium. In this context, the refractive index n may be an ideal refractive index 1.33 for water at the water puddle 190 on the road surface 170.

$$R_s = \frac{\sin^2(\theta_1 - \theta_2)}{\sin^2(\theta_1 + \theta_2)} \quad (2)$$

$$R_P = \frac{\tan^2(\theta_1 - \theta_2)}{\tan^2(\theta_1 + \theta_2)} \quad (3)$$

$I_{Rs}$ represents an intensity of the s-wave of the received light and $I_{Rp}$ represents an intensity of p-wave component of the received light. Additionally, it should be noted that the $I_{Rs}$ and $I_{Rp}$ components are also function of refractive indices of air and reflecting surface layer, e.g. water puddle, and the reflection angle, $\theta_1$. These values may be determined based on Equations (2)-(3) according to p-wave and s-wave differences.

Using the basic definition of polarization degree to analyze the relations between $I_{total}$ and $I_R$ we can develop the following relationship. A degree of linear polarization $P_{total}$ of light received at the camera sensor 130 can then be determined, e.g., using Equation (4). Further, a degree of polarization of reflected light can be determined using Equation (5).

$$P_{total} = \frac{I_{total} \cdot s - I_{total} \cdot p}{I_{total} \cdot s + I_{total} \cdot p} = \frac{(I_{Rs} + I_{Ds}) - (I_{Rp} + I_{Dp})}{I_{total}} \quad (4)$$

$$P_R = \frac{I_{Rs} - I_{Rp}}{I_R} \quad (5)$$

An intensity of diffused light $I_D$ can then be calculated, e.g., according to Equation (6). A vehicle 100 processing system 110 may be programmed to calculate the diffused intensity $I_D$, using Equation (6), based on intensities $I(0°)$, $I(45°)$, $I(90°)$, $I(135°)$, degree of linear polarization $P_{total}$, and a degree of polarization of reflected light $P_R$. In the example from the cited paper, the degree of polarization of reflected light $P_R$ may be obtained from the simulated polarization characteristics of reflected and refracted light where the refraction index of air and water are known. Furthermore, $P_R$ is dependent upon the reflection angle which can be estimated based on vehicle sensors (e.g. vehicle inclination) and/or stored data (e.g. map data indicating road inclination) per each pixel given knowledge of the lens optics (e.g. use of camera projection matrix). In the present context, a camera matrix or (camera) projection matrix is a 3×4 matrix which describes the mapping of 3D points in the real world to 2D points in an image. Thus, according to Equation (6), the processing system 110 may be programmed to determine Stokes parameters of the polarimetric image based on received intensity levels of light at a plurality of polarization degrees, to determine a degree of linear polarization of light, and to determine the reflected light based on the determined degree of linear polarization. The processing system 110 may be programmed to determine the reflected light in the received image by determining s-wave components and p-wave components of the polarimetric image.

$$I_D = I_{total} \cdot \left(1 - \frac{P_{total}}{P_R}\right) = \quad (6)$$

$$(I(0°) + I(90°)) \cdot \left(1 - \frac{\sqrt{(I(0°) - I(90°))^2 + (I(45°) - I(135°))^2}}{(I(0°) + I(90°)) \cdot P_R}\right)$$

As discussed above, the processing system 110 may be programmed to detect road features such as lane markings 180 based on image data received from a camera sensor 130. Further, as discussed above, light hitting a wet or icy road surface 170 may be substantially reflected rather than diffused. When light received from a location on the road surface 170 is substantially reflected, then detection of road features such as lane markings 180 may be impaired. With reference to FIG. 1, a vehicle 100 processing system 110 can be programmed to receive a polarimetric image from a polarimetric camera sensor 130, to identify a road surface 170 in the received image based on a vehicle 100 location, an orientation of the camera sensor 130, and a vehicle 100 pose. Additionally or alternatively, the processing system 110 may be programmed to identify the road surface 170 in the received image based on the vehicle 100 location, the orientation of the camera sensor 130, the vehicle 100 pose and the received map data. The processing system 110 can be programmed to identify, in the polarimetric image, polarized light reflections from the identified road surface 170 based on a polarization direction and a polarization degree determined from the polarimetric image. Upon identifying the polarized light reflections, the processing system 110 can then remove the identified polarized light reflections from the polarimetric image, thereby generating an updated polarimetric image. The processing system 110 can then, from the updated polarimetric image, identify a road feature including a lane marking 180.

As discussed above, the processing system 110 may be programmed to determine the vehicle 100 pose and location based on HD map data, the received sensor 130 data, e.g., LIDAR sensor 130, camera sensor 130, etc. The processing system 110 may determine the vehicle 100 location further based on data received from a vehicle 100 GPS sensor 130. HD map data includes location coordinates of points on the road surface 170. Thus, based on the determined vehicle 100 pose, vehicle 100 location, the HD map data, the processing system 110 may estimate respective locations of points on the road surface 170 within an area surrounding the vehicle 100, e.g., within a radius of 100 meters around the vehicle 100. Additionally or alternatively, processing system 110 may be programmed to detect the road surface 170 in the received image using image processing techniques. Thus, in at least some examples, the processing system 110 may be programmed to determine location coordinates of points on the road surface 170 based on the vehicle 100 location, the vehicle 100 pose, the detected road surface 170 using image processing techniques, e.g., projective transformation techniques.

Based on the optical properties of the camera sensor 130, e.g., focal point, field of view 135, etc., the processing system 110 may determine location coordinates of points on surfaces (e.g., road, landscaping, signs, buildings, etc.) represented in the received camera sensor 130 image. In other words, the processing system 110 can determine in a w by h pixel image that a pixel at location (a, b) with respect to, e.g., bottom left corner of image, corresponds to a point on the road surface 170 with location coordinates x, y, z with respect to coordinate system 160. The processing system 110 may be programmed to identify the road surface 170 in the image by identifying a plurality of pixels in the received image that represent the road surface 170 based on the vehicle 100 location, the vehicle 100 pose, and the orientation of the camera sensor 130. The processing system 110 may be programmed to determine location coordinates of a point in the real world corresponding to a pixel in the image based on conventional techniques or factors, e.g., the camera sensor 130 orientation, the vehicle 100 pose, and sensor 130 data using conventional geometric techniques. In one example, the processing system 110 may determine whether the respective point is on the road surface 170 based on HD map data specifying road surface 170 boundaries. Additionally or alternatively, the processing system 110 may be programmed to determine whether the respective point is on the road surface 170 based on image processing techniques detecting the road surface 170 in the received image.

The processing system 110 may be programmed to determine diffused (or refracted) light from the road surface 170 by removing the received reflected light from the polarimetric image. The processing system 110 may then identify the road feature, e.g., lane marking 180, based on refracted light represented in the updated polarimetric image (i.e., image after removing the identified reflected light).

As discussed above, the processing system 110 may be programmed to identify a plurality of image pixels corresponding to the detected road surface 170. The processing system 110 may be programmed, using Equation (6), to determine a diffused light intensity $I_D$ for each of the identified plurality of image pixels.

The processing system 110 may be programmed to update the received image by generating a de-mosaicked image based on the identified polarized light reflections, while the identified polarized light reflections are ignored (or removed) at de-mosaicking. The processing system 110 may be programmed to remove the polarized light reflections from a portion of the image corresponding to the road surface 170 based on the calculated diffused light intensity $I_D$. For example, the processing system 110 may be programmed to change a light intensity of each of the identified plurality of pixels corresponding to the road surface 170 from the measured total light intensity $I_{total}$ (including both reflected and diffused light) to the diffused light intensity $I_D$. Thus, the generated de-mosaicked image lacks the polarized light reflections.

In yet another example, the processing system 110 may be programmed to determine that an area on the road surface 170 is wet upon determining that, e.g., a ratio of reflected light intensity $I_R$ to total light intensity $I_{total}$ of a plurality of image pixels corresponding to the area exceeds a threshold, e.g., 70%. For example, a road pixel with large reflected polarized light Intensity, $I_R$, will be assigned a different polarization angle than a road pixel with small reflected light intensity. Pixels associated with wet areas may be identified as they may have a different polarization angle compared to pixels associated with other portions of the road 170 which do not have a high intensity polarized reflections. The processing system 110 may be programmed to detect wet areas such as road surface 170 based on the polarized light reflections and to update only image pixels corresponding to the detected wet areas on the road surface 170. Thus, in this example, the processing system 110 may operate more efficiently for detecting the road features in wet areas because the processing system 110 only updates image pixels corresponding to the wet area of the road surface 170 instead of updating the image pixels corresponding to entire road surface 170. The processing system 110 may be programmed to detect polarization angle of each pixel of the received image. For example, a greatest component of the total intensity will determine the polarization angle assigned to a pixel. Pixels associated with wet areas may be identified as they may have a different polarization angle compared to pixels associated with other portions of the road 170 which do not have a high intensity polarized reflections. Thus, the processing system 110 may be programmed to identify wet areas of a road 170 based on polarization angle determined for each pixel of the image. Additionally or alternatively, the processing system 110 may be programmed to predict whether a lane marking 180 can be recognized by a second vehicle (e.g., a vehicle not equipped with the method disclosed herein which may not detect the lane marking 180 in a wet area). The processing system 110 may estimate a maneuver of the second vehicle 100 upon predicting that the second vehicle does not detect the lane marking 180 in the wet area, e.g., an unexpected lane departure due to not detecting the lane marking 180. Thus, the vehicle 100 processing system 110 may be programmed to perform an action, e.g., increasing distance to the second vehicle by reducing speed, changing lane, etc., upon predicting an unexpected maneuver of the second vehicle.

The processing system 110 may be programmed to detect road feature(s) by using the updated image and then to actuate the vehicle 100 based on detected road feature(s). The processing system 110 may be programmed to actuate a vehicle 100 propulsion, steering, and/or braking based on the detected road feature. For example, the processing system 110 may be programmed to actuate the vehicle 100 steering to maintain the vehicle 100 in a lane based on the detected lane markings 180.

As discussed above, the processing system 110 may be programmed to determine a signal-to-noise ratio of an image, e.g., the updated polarimetric image. In one example, upon determining that the signal-to-noise ratio of the updated polarimetric image is less than a threshold, e.g., 20 dB (i.e., noise exceeding a threshold which may impair road feature detection), the processing system 110 may be programmed to receive multiple additional polarimetric images and to update each of the received polarimetric images (as discussed above). Further, the processing system 110 can be programmed to then calculate an average light intensity $I_{total}$ for each pixel by calculating an average light intensity based on light intensity of corresponding pixel in each of the received multiple images. In other words, a "moving average" light intensity $I_{total}$ over multiple recent images can be used to detect road features rather than using a single image. This technique may reduce problems caused by image noise.

Figure 3A:
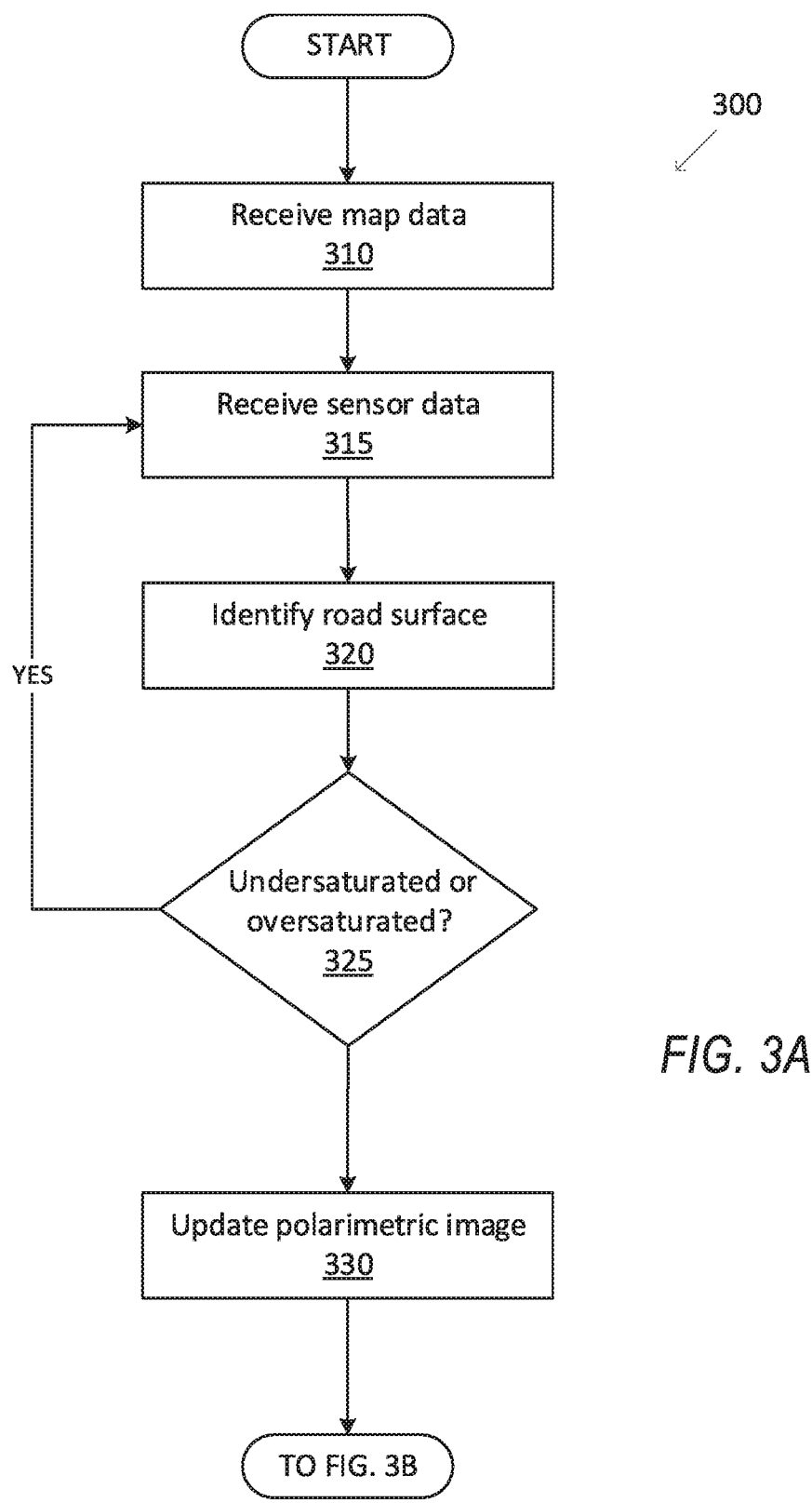
FIGS. 3A-3B illustrate a flowchart of an exemplary process for detecting road features and operating a vehicle.
Figure 3B:
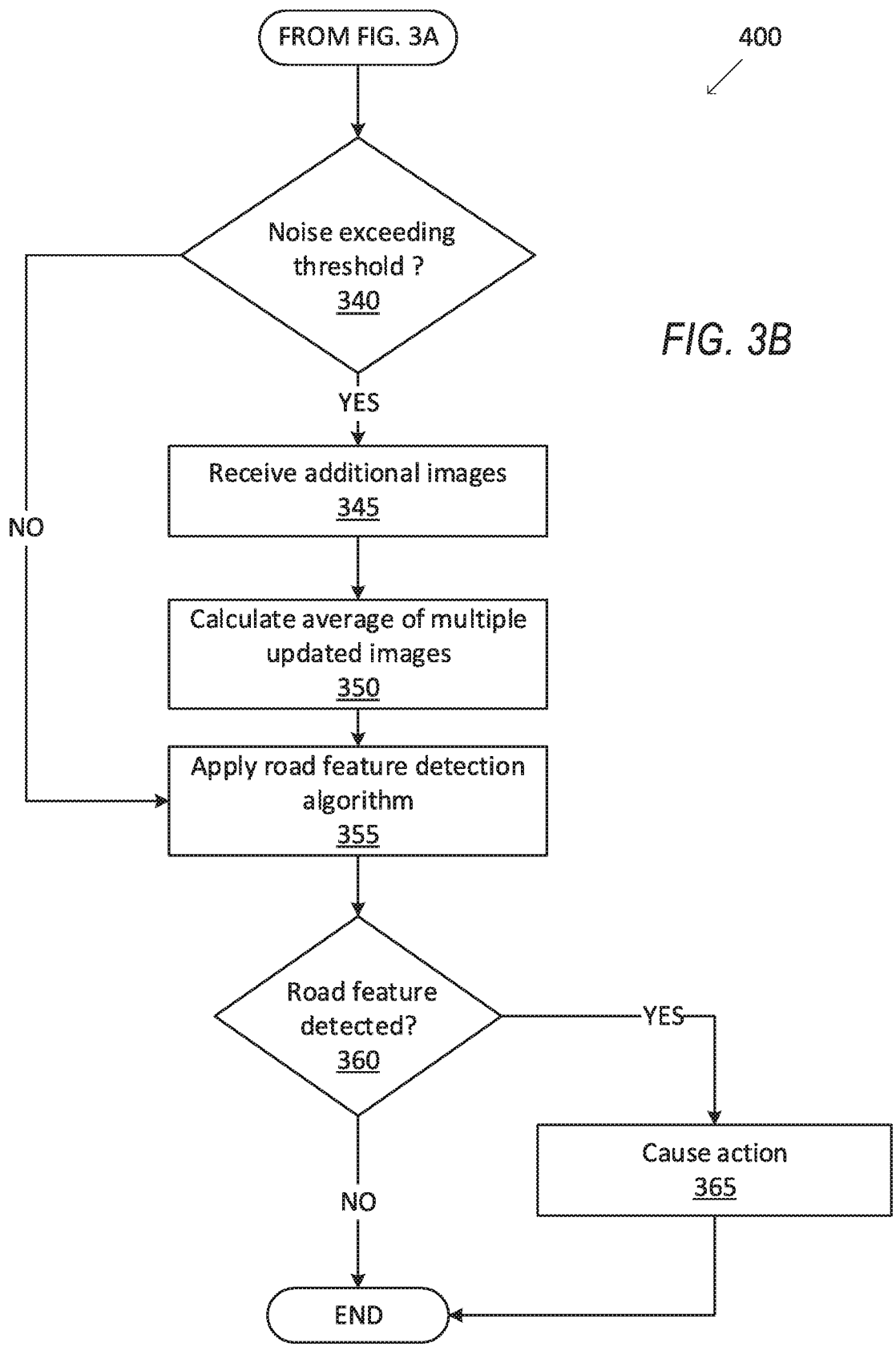

FIGS. 3A-3B are a flowchart of an example process 300 for detecting road features and operating a vehicle 100 based on detected road features. A vehicle 100 processing system 110 may be programmed to execute blocks of the process 300. As discussed above, a processing system 110 may include a combination of processor(s) and dedicated hardware component(s). In one example, a dedicated hardware, e.g., an FPGA, may be configured to execute some block(s) of the process 300, whereas a processor may be programmed to execute some other blocks of the process 300. Additionally or alternatively, an operation of a block of the process 300 may be performed by a combination of a processor and a dedicated hardware included in the processing system 110.

With reference to FIG. 3A, the process 300 begins in a block 310, in which the processing system 110 receives map data. The processing system 110 may be programmed to receive HD map data including 3D location coordinates of points on surfaces of an area, e.g., a city, a neighborhood, a state, etc., from a remote computer, e.g., a cloud computer. Alternatively, as discussed above, the process 300 may begin with the block 315, thus the process 300 may lack the block 310.

Next, in a block 310, the processing system 110 receives data from vehicle 100 sensors 130. The processing system 110 may be programmed to receive polarimetric image data from one or more polarimetric camera sensors 130 directed toward an exterior of the vehicle 100, e.g., forward-looking and/or rear-looking. The processing system 110 may be programmed to localize the vehicle 100 (i.e., determining vehicle 100 location coordinates and a vehicle 100 pose) based on the received map data and vehicle 100 sensor 130 data. Additionally or alternatively, the processing system 110 may be programmed to localize the vehicle 100 based on the vehicle 100 pose, the vehicle 100 location, and the data received from the polarimetric camera sensors 130.

Next, in a block 320, the processing system 110 identifies the road surface 170 in the received polarimetric image. The processing system 110 may be programmed to identify pixels in the received image which correspond to the point on the road surface 170. The processing system 110 may identify points on the road surface based on vehicle 100 location, and vehicle 100 pose using image processing techniques, e.g., projective transformation. Additionally or alternatively, the processing system 110 may be programmed to identify points on the road surface 170 based on the received map data, e.g., HD map data, the vehicle 100 pose, and the vehicle 100 location.

Next, in a decision block 325, the processing system 110 determines whether the received image is (i) oversaturated or undersaturated or (ii) neither oversaturated nor undersaturated. The processing system 110 may be programmed to calculate a histogram of the received image and determine whether the image is oversaturated or undersaturated based on the determined histogram. If the processing system 110 determines that the received polarimetric image is either oversaturated or undersaturated, then the process 300 returns to the block 315; otherwise the process 300 proceeds to a block 330.

In the block 330, the processing system 110 updates the received polarimetric image. The processing system 110 can be programmed to update the polarimetric image by removing the polarized light reflections in the received polarimetric image. As discussed above, the processing system 110 may be programmed to remove the polarized light reflections from a plurality of pixels of the image, e.g., pixels corresponding to the road surface, and then to generate an updated image by de-mosaicking the updated image pixels.

Turning to FIG. 3B, next, in decision block 340, the processing system 110 determines whether a noise level in the image exceeds a specified threshold, e.g., based on a calculated signal-to-noise ratio. If the processing system 110 determines that the noise level exceeds the specified threshold, then the process 300 proceeds to a block 345; otherwise the process 300 proceeds to a block 355.

In the block 345, the processing system 110 receives one or more additional polarimetric images from the polarimetric camera sensor 130. The processing system 110 may be programmed to update the additionally received images, as discussed above, by removing polarized light reflections from each of the additionally received images.

Following the block 345, in a block 350, the processing system 110 calculates an average of multiple received and updated images. The processing system 110 may be programmed to calculate an average light intensity $I_{total}$ for each pixel by calculating an average light intensity based on light intensity of corresponding pixel in each of the received multiple images.

Next in the block 355, which may be additionally reached from the decision block 340, the processing system 110 applies a road feature detection algorithm, e.g., a lane marking detection algorithm, to the updated image data. The processing system 110 may be programmed to detect road features on the road surface 170 using image processing techniques. The processing system 110 may determine location coordinates of lane markings 180 with respect to the coordinate system 160.

Next, in a decision block 360, the processing system 110 determines whether a road feature, e.g., a lane marking 180, is detected. If the processing system 110 determines that a road feature such as a lane marking 180 is detected, the process 300 proceeds to a block 365; otherwise the process 300 ends, or alternatively returns to the block 310, although not shown in FIGS. 3A-3B.

In the block 365, the processing system 110 causes an action based on the detected road feature. For example, the processing system 110 may be programmed to actuate a vehicle 100 steering actuator 120 to keep a vehicle 100 within a lane based on the detected lane marking 180, e.g., at a left and/or right side of the lane. Following the block 365, the process 300 ends, or alternatively returns to the block 310, although not shown in FIGS. 3A-3B.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Intercal, Java™ C, C++, Visual Basic, Java Script, Perl, Python, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A processing system, comprising a processor and a memory, the memory storing instructions executable by the processor to:
   receive a polarimetric image from a polarimetric camera sensor;
   identify a road surface in the received image based on a vehicle location, an orientation of the camera sensor, and a vehicle pose;
   upon identifying, in the polarimetric image, polarized light reflections from the identified road surface based on a polarization direction and a polarization degree determined from the polarimetric image, remove the identified polarized light reflections from the polarimetric image, thereby generating an updated polarimetric image including generating a de-mosaicked image based on the identified polarized light reflections by combining image data received from adjacent optoelectronic sensors into a single polarimetric image, wherein the identified polarized light reflections are ignored at de-mosaicking; and
   identify a road feature including a lane marking based on the updated polarimetric image.

2. The processing system of claim 1, wherein the instructions to identify the road surface include instructions to identify a plurality of pixels in the received image that represent the road surface based on the vehicle location, the vehicle pose, and the orientation of the camera.

3. The processing system of claim 1, wherein the instructions further include instructions to:
   determine intensity of a plurality of pixels in the received image;
   calculate a histograms of the received image based on the determined intensities;
   determine whether the received image is oversaturated or undersaturated based on the calculated histogram of the received image; and
   upon determining that one of an oversaturation and undersaturation exists in the received polarimetric image, modify a camera parameter and receive a second polarimetric image based on the modified camera parameter.

4. The processing system of claim 3, wherein the instructions to modify the camera parameter include instructions to increase a camera exposure time upon determining that the received image is undersaturated.

5. The processing system of claim 3, wherein the instructions to modify the camera parameter include instructions to decrease a camera exposure time upon determining that the received image is oversaturated.

6. The processing system of claim 1, wherein the instructions to identify the road surface in the received image is further based on map data.

7. The processing system of claim 1, wherein the road features include at least one of a solid single line, solid double line, single broken line, and pedestrian marking.

8. The processing system of claim 1, wherein the instructions further include instructions to, upon determining that a noise ratio of the updated image exceeds a threshold, (i) ignore the received polarimetric image, (ii) receive a second polarimetric image, and (iii) identify the road feature based on an updated second polarimetric image.

9. The processing system of claim 1, wherein the instructions further include instructions to determine refracted light from the road surface by removing the received polarized light reflections from the polarimetric image and identifying the road feature based on refracted light represented in the updated polarimetric image.

10. The processing system of claim 9, wherein the instructions further include instructions to:
determine a Stokes parameter of the polarimetric image based on received intensity levels of light at a plurality of polarization degrees;
determine a degree of linear polarization of the image based on the determined Stokes parameters; and
determine the reflected light based on the determined degree of linear polarization.

11. The processing system of claim 9, wherein the instructions to determine the reflected light include instructions to determine s-wave components and p-wave components of the polarimetric image.

12. The processing system of claim 1, wherein the instructions further include instructions to actuate the vehicle based on detected road feature.

13. The processing system of claim 1, wherein the instructions further include instructions to detect a wet area on the road surface based on identified polarized light reflections and to update image pixels corresponding to the detected wet area.

14. A method, comprising:
receiving a polarimetric image from a polarimetric camera sensor;
identifying a road surface in the received image based on a vehicle location, an orientation of the camera sensor, and a vehicle pose;
upon identifying, in the polarimetric image, polarized light reflections from the identified road surface based on a polarization direction and a polarization degree determined from the polarimetric image, removing the identified polarized light reflections from the polarimetric image, thereby generating an updated polarimetric image including generating a de-mosaicked image based on the identified polarized light reflections by combining image data received from adjacent optoelectronic sensors into a single polarimetric image, wherein the identified polarized light reflections are ignored at de-mosaicking; and
identifying a road feature including a lane marking based on the updated polarimetric image.

15. The method of claim 14, further comprising identifying the road surface by identifying a plurality of pixels in the received image that represent the road surface based on the vehicle location, the vehicle pose, and the orientation of the camera.

16. The method of claim 14, further comprising identifying the road surface in the received image further based on map data.

17. The method of claim 14, wherein the road features include at least one of a solid single line, solid double line, single broken line, and pedestrian marking.

18. The method of claim 14, further comprising determining refracted light from the road surface by removing the received polarized light reflections from the polarimetric image and identifying the road feature based on refracted light represented in the updated polarimetric image.

19. The method of claim 18, further comprising:
determining a Stokes parameter of the polarimetric image based on received intensity levels of light at a plurality of polarization degrees;
determining a degree of linear polarization of the image based on the determined Stokes parameters; and
determining the reflected light based on the determined degree of linear polarization.

20. The method of claim 14, further comprising detecting a wet area on the road surface based on identified polarized light reflections and to update image pixels corresponding to the detected wet area.

* * * * *